United States Patent [19]

Wagner

[11] Patent Number: 4,675,724

[45] Date of Patent: Jun. 23, 1987

[54] VIDEO SIGNAL PHASE AND FREQUENCY CORRECTION USING A DIGITAL OFF-TAPE CLOCK GENERATOR

[75] Inventor: Steven D. Wagner, San Jose, Calif.

[73] Assignee: Ampex Corporation, Redwood City, Calif.

[21] Appl. No.: 781,293

[22] Filed: Sep. 27, 1985

[51] Int. Cl.[4] .................. H04N 9/455; H04N 9/89; H04N 5/95

[52] U.S. Cl. .................. 358/19; 358/320; 358/339; 360/36.2

[58] Field of Search ............ 358/19, 13, 320, 337, 358/339; 360/36.1, 36.2

[56] References Cited

U.S. PATENT DOCUMENTS

| | | | |
|---|---|---|---|
| 3,578,902 | 5/1971 | Monsay | 358/323 |
| 3,860,952 | 1/1975 | Tallent et al. | 358/19 |
| 4,015,288 | 3/1977 | Ebihara et al. | 358/19 |
| 4,018,990 | 4/1977 | Long et al. | 358/149 |
| 4,069,499 | 1/1978 | Ninomiya | 358/8 |
| 4,081,826 | 3/1978 | Ninomiya | 358/8 |
| 4,107,736 | 8/1978 | Lowry et al. | 358/36 |
| 4,109,276 | 8/1978 | Hopkins, Jr. et al. | 358/4 |
| 4,119,999 | 10/1978 | Gallo | 358/4 |
| 4,120,000 | 10/1978 | Ninomiya | 358/8 |
| 4,165,524 | 8/1979 | Ninomiya | 360/36 |
| 4,212,027 | 7/1980 | Lemoine | 358/8 |
| 4,249,198 | 2/1981 | Ito et al. | 358/13 |
| 4,291,332 | 9/1981 | Kato et al. | 358/19 |
| 4,373,168 | 2/1983 | Mizakami et al. | 358/19 |
| 4,404,531 | 9/1983 | Genrich et al. | 331/64 |
| 4,443,821 | 4/1984 | Kato | 358/326 |
| 4,463,371 | 7/1984 | Lewis, Jr. | 358/13 |
| 4,527,145 | 7/1985 | Haussman et al. | 358/19 |
| 4,555,734 | 11/1985 | Fukui | 360/36.1 |
| 4,563,657 | 1/1986 | Qureshi et al. | 375/120 |
| 4,612,568 | 9/1986 | den Hollander et al. | 358/19 |
| 4,633,298 | 12/1986 | Steckler et al. | 358/13 |

OTHER PUBLICATIONS

Operator's Manual for the Model DPS-1 Digital Processing System manufactured by Digital Video Systems, John D. Lowry, no date.

Primary Examiner—James J. Groody
Assistant Examiner—Robert M. Bauer
Attorney, Agent, or Firm—Nathan N. Kallman; George B. Almeida; Joel D. Talcott

[57] ABSTRACT

In a time base correction system, a composite color television analog signal derived from a prerecorded tape is converted by an analog-to-digital (A/D) converter to a digital signal having horizontal sync and color burst signal components. The digitized sync and burst signals are processed on a line-by-line basis to provide an error signal between input video and a sampling clock in the form of a binary control word. The error signal is applied to a digital frequency synthesizer which generates a clock at the subcarrier frequency to achieve precise adjustment of frequency and phase of the A/D sampling clock with respect to the video signal. An analog phase locked loop operating at four times the subcarrier frequency feeds back a 4× subcarrier sampling clock to the analog-to-digital converter with adjustable frequency and phase.

25 Claims, 10 Drawing Figures

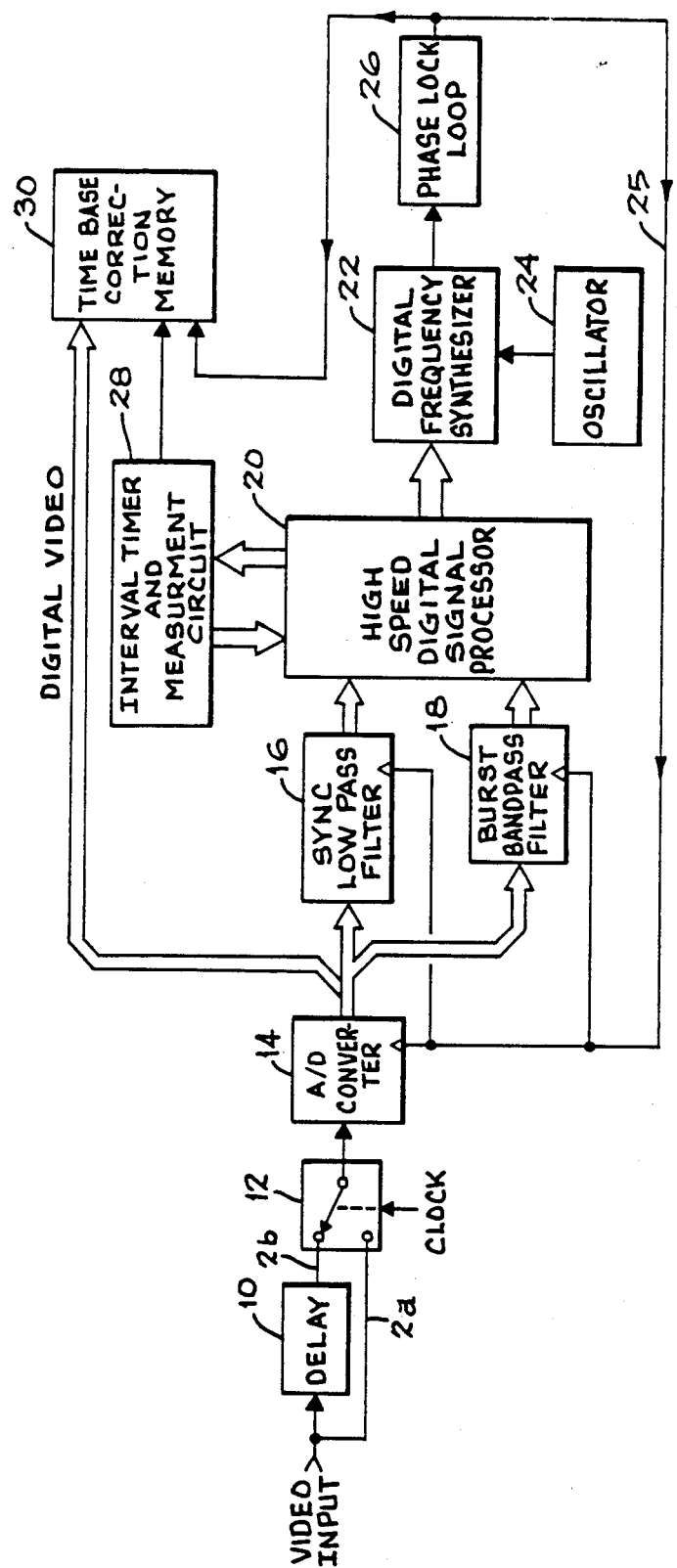
FIG_1

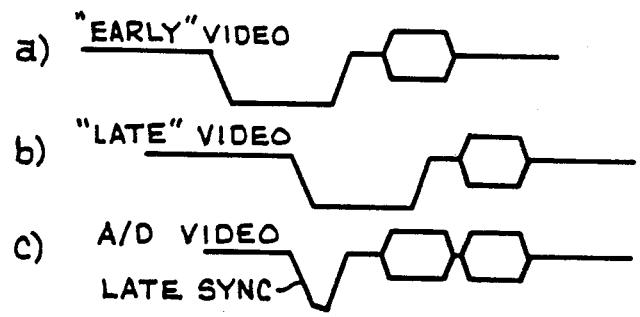
FIG_2
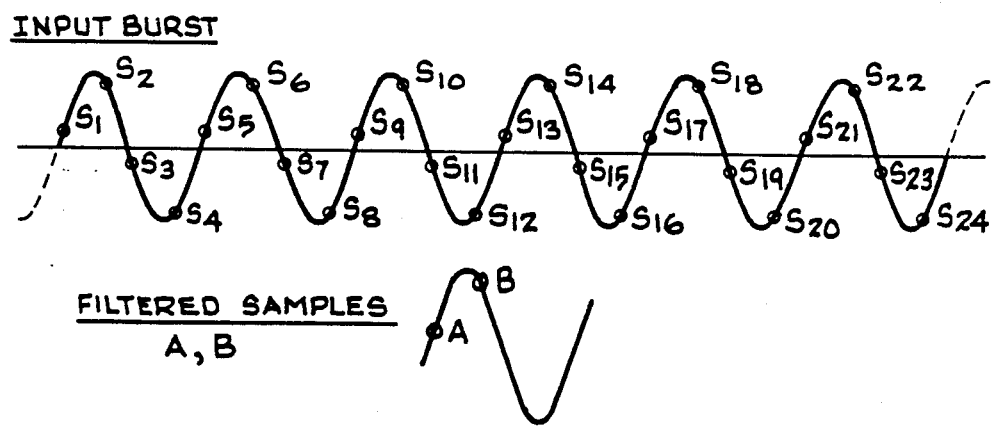
$A = S_1-S_3+S_5-S_7+S_9-S_{11}+S_{13}-S_{15}+S_{17}-S_{19}+S_{21}-S_{23}$
$B = S_2-S_4+S_6-S_8+S_{10}-S_{12}+S_{14}-S_{16}+S_{18}-S_{20}+S_{22}-S_{24}$
FIG_3

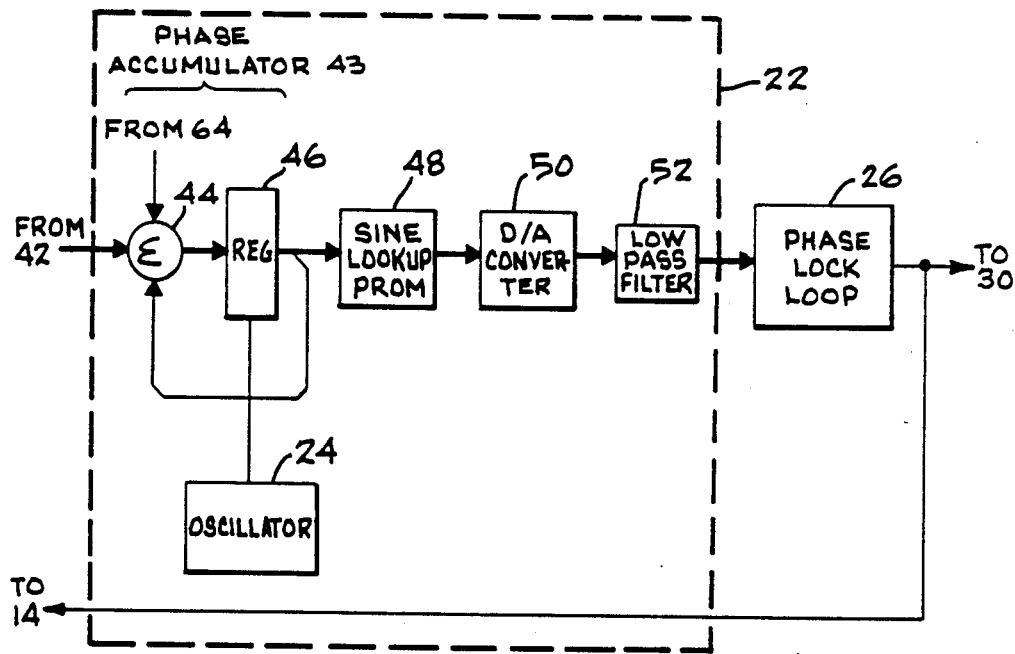
FIG_5
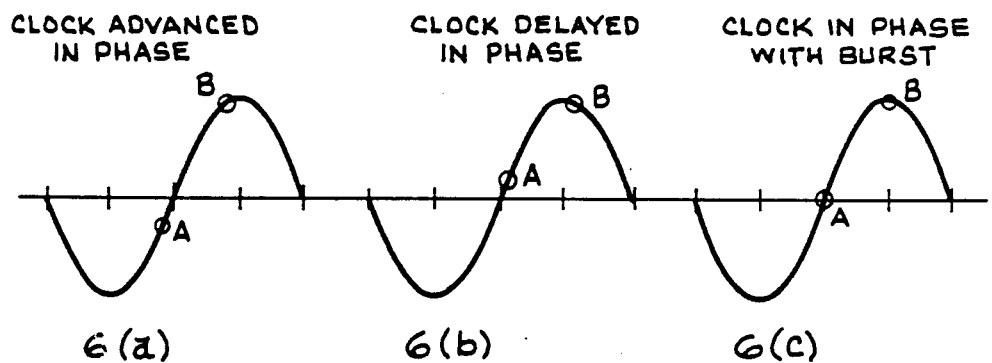
FIG_6

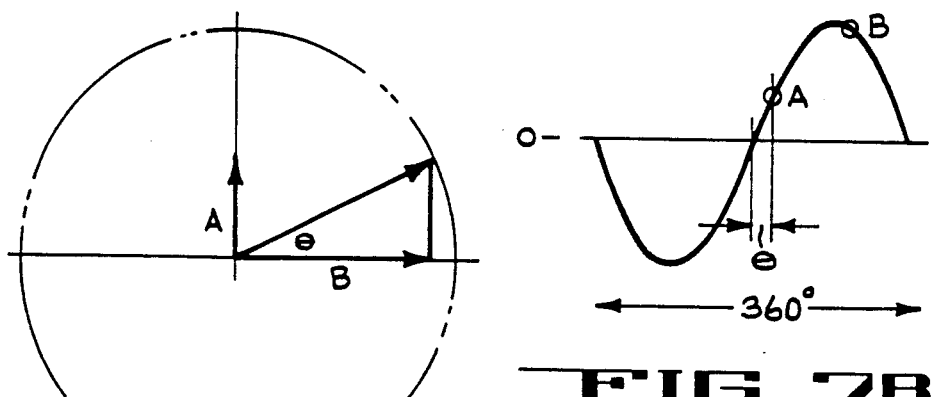
FIG_7A
FIG_7B
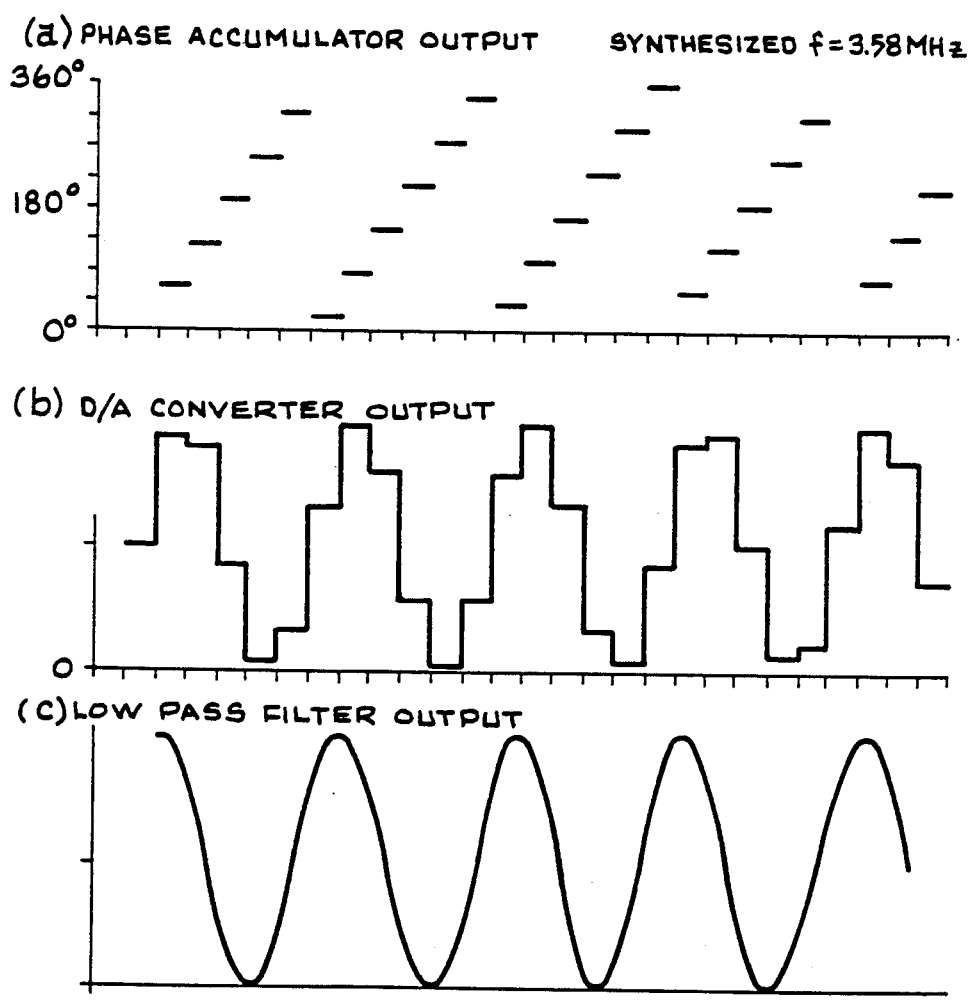
FIG_8

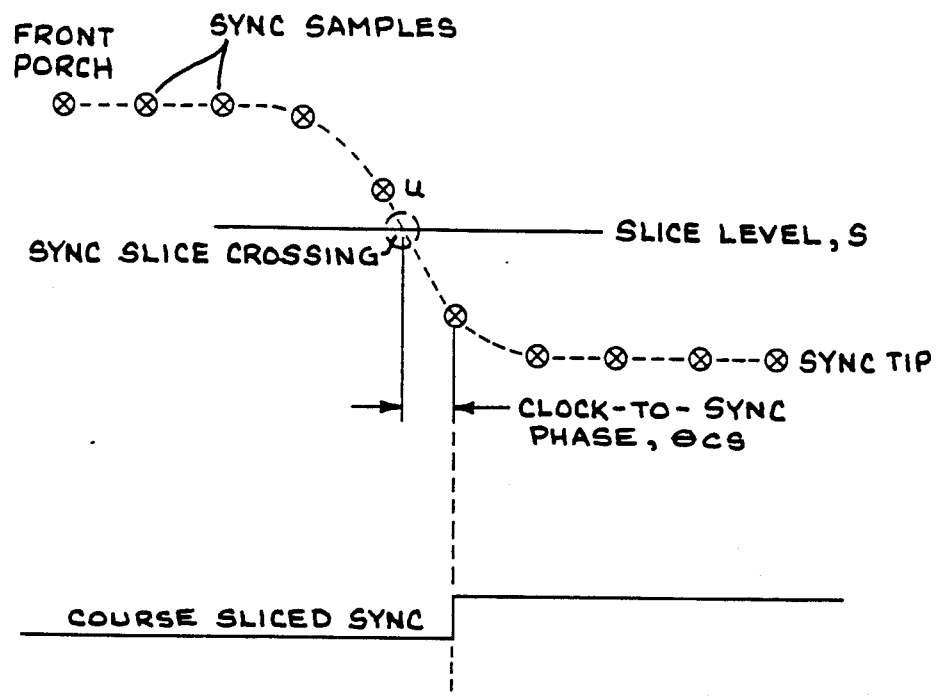
FIG_9

VIDEO SIGNAL PHASE AND FREQUENCY CORRECTION USING A DIGITAL OFF-TAPE CLOCK GENERATOR

TECHNICAL FIELD

This invention relates to a time base correction system and in particular to a system that employs digital circuitry for measuring and correcting frequency and phase errors of a recorded color television signal during playback.

BACKGROUND ART

In color television recording systems that employ NTSC signals including horizontal sync and color burst components, inter alia, it is usually necessary to correct the timing errors caused by variations in tape speed, for example, or for frequency and phase differences appearing in the signal that is recorded. In order to provide the desired correction, prior art video systems generally employ a phase locked loop (PLL) including a voltage controlled oscillator (VCO) to measure the difference in phase and frequency between the VCO clock frequency and the burst signal component of the composite color television signal. Also, to eliminate time base errors and provide a high degree of signal stability, it has been proposed to use digital circuits to digitize the video signal and to generate an error signal that is stored in memory to be used for frequency and phase correction. In such systems, correction of the phase error is accomplished in the time base correction network at the output of the system on a line-by-line basis. However, the phase error is cumulative and builds up along each horizontal line, so that it becomes more difficult to compensate for large phase errors. In addition, the phase locked loops used in prior art systems do not operate sufficiently fast to follow the rapid changes in the frequency and phase of the video signal recorded on the fast moving tape.

SUMMARY OF THE INVENTION

The invention overcomes the above disadvantage while providing various added advantages over present schemes for correcting frequency and phase errors. Thus, the invention provides an improved time base correction system employing digital circuitry in which adjustments for frequency and phase errors are minimized. Further, the invention provides a time base correction system that follows and corrects frequency and phase errors relatively rapidly to avoid buildup of large errors.

In providing the above features, a sampling clock is used which has a precise and continuous relationship to the color subcarrier of the incoming video signal.

More particularly, the inventive time base correction system provides phase correction of a color video signal, which includes a color burst component, by employing a clock signal having a frequency that is a mutliple of the subcarrier frequency. The clock signal is locked in phase to the color burst component of the video signal and phase correction is effected with reference to a digital sampled burst signal so that any errors in the analog portion of the video signal are reduced to zero in a closed loop arrangement.

In a specific embodiment of the invention, a time base correction system converts components of an off-tape analog video signal to digital pulses. The digitized sync and burst components of the video signal are filtered and processed in a high speed digital signal processor to generate a frequency control word. A digital frequency synthesizer generates a clock signal at subcarrier frequency in response to the frequency control word, and the clock signal is applied to an analog-to-digital (A/D) converter which operates at four times the subcarrier frequency. The output of the A/D converter is a series of binary words at the multiplied frequency rate representing samples of successive portions of the video signal. The samples are fed back to the input of a closed feedback loop constituting sync and burst filters, a processor, synthesizer and phase locked loop. The clocked binary data samples of off-tape video signal are passed to a time base correction memory for further time base correction of the sampled video signal.

BRIEF DESCRIPTION OF THE DRAWINGS

The invention will be described with reference to the drawing in which:

FIG. 1 is a block diagram of the clock generator of this invention;

FIGS. 2a–c are waveforms representing the timing relation of early and late video signals;

FIG. 3 is a sinusoidal waveform representing the input analog burst signal and the digitized filtered samples A and B;

FIG. 5 is a schematic block diagram of the frequency synthesizer of FIG. 1;

FIGS. 6a–c depict burst samples representing change with reference to clock phase error;

FIGS. 7a and 7b represent the phase error angle $\theta$ between clock samples and burst zero crossings;

FIGS. 8a–c show the outputs of the phase accumulator, digital-to-analog converter and low pass filter respectively, of the frequency synthesizer of FIG. 5; and FIG. 9 portrays the relation of the 4× subcarrier sync samples relative to a defined slice level obtained from digitized sync edge detection.

Similar numerals refer to similar elements throughout the drawings.

DESCRIPTION OF THE PREFERRED EMBODIMENT

Figure 4:
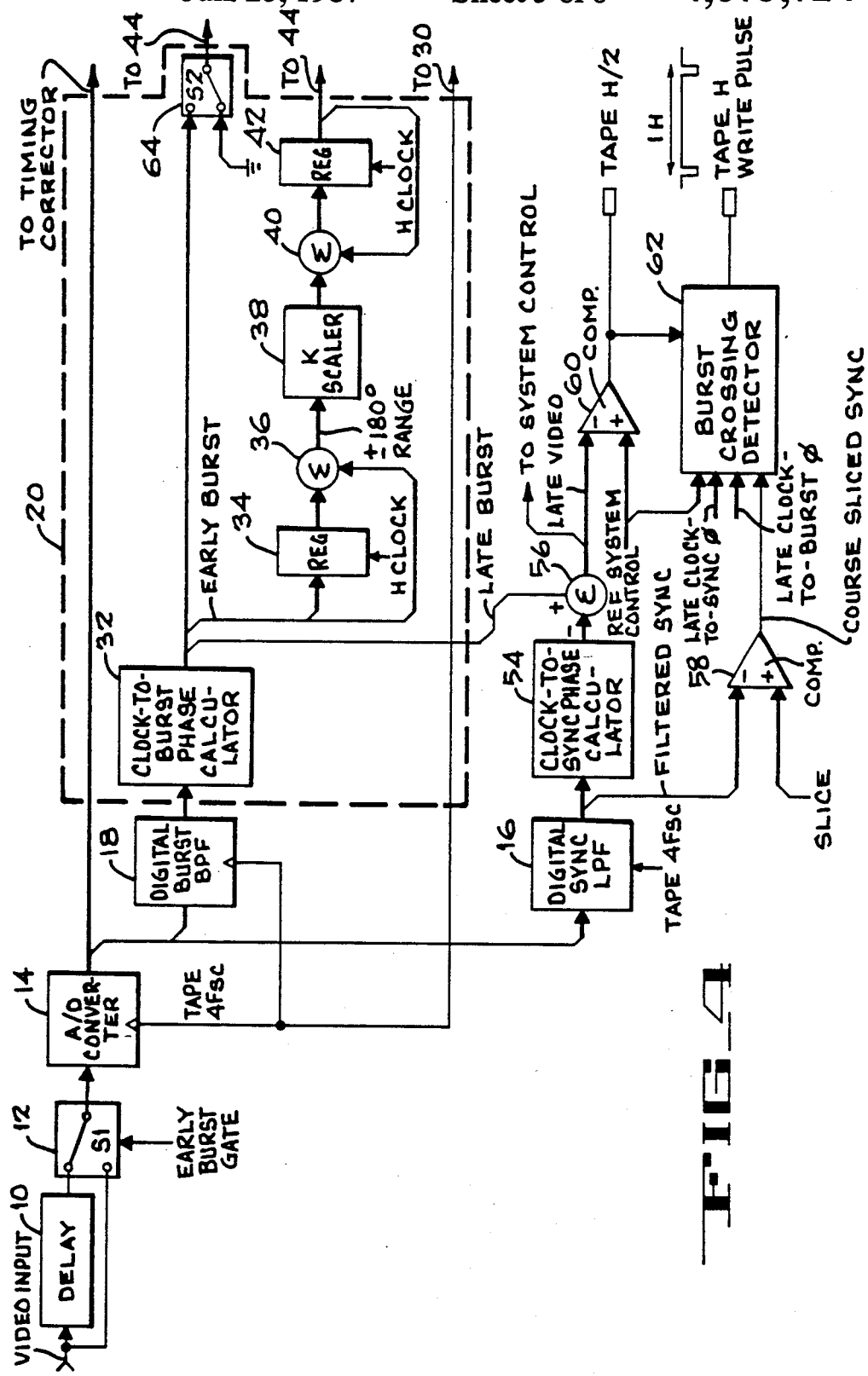
FIG. 4 is a shcematic block diagram of the high speed digital signal processor of FIG. 1.

With reference to FIG. 1, a composite analog video signal is derived from a prerecorded magnetic tape and passed through a delay circuit 10 providing a delay of one horizontal line, i.e., 63.5 μsec. plus 3.5 μsec, or a total delay of approximately 67.0 μsec. This delay produces a "late video" signal and allows a look ahead at the phase of the burst signal at the beginning and at the end of each horizontal line to determine whether any changes in phase have occurred during the period of the horizontal line under consideration. A delay of more than one television line enables the video input to switch dynamically between the delayed burst signal and the burst of the undelayed signal, so that both burst signals are applied through a gated switch 12 to an analog-to-digital converter 14. The delayed analog signal is applied to the gated switch 12 which is normally in the "late video" position, but switches to "input video" or "early video" during the input video burst time. The output signal from the timed switch contains active video and burst components and the leading edge of the horizontal sync from the late video signal, as well as the burst component of the input or early video signal. The timing relationship of the early and late video signals and the combined signal obtained from the output circuit of the grated switch 12 are delineated in FIG. 2.

The combined signal is passed to the analog-to-digital converter 14, which samples the video output signal from the switch 12 at four times the subcarrier frequency, digitized to nine-bit words. Each digital word having sync and burst is processed by the time base correction circuit of this invention to determine and compensate phase and frequency errors that occur between the input video and a $4f_{sc}$ (4× subcarrier frequency) clock. The digitized signal, containing the early burst and late burst components, is passed through a sync low pass filter 16 and a burst bandpass filter 18. The low filter 18 averages about six cycles of each burst to reject chroma noise. For each burst, the bandpass filter 18 produces two filtered samples, designated as "A" and "B", which are 90° apart, as illustrated in FIG. 3. As shown in FIG. 3, the filtered samples A and B comprise the odd and even samples respectively, which are averaged about a baseline by adding the differences between each pair of samples in one complete cycle.

The filtered burst samples A and B are applied to a high speed digital signal processor 20 which is illustrated in detail and will be described with reference to FIG. 4. The signal processor 20 calculates the sync and burst phase errors relative to the clock generated in a closed feedback loop, which includes the processor 20, a digital frequency synthesizer 22 that operates under control of a fixed reference clock or crystal oscillator 24, and an analog phase lock loop 26 operating at a frequency 4 times the subcarrier frequency $f_{sc}$. The feedback clock signal is returned via lead 25 to the converter 14 and to the filters 16 and 18, and allows precise adjustment of frequency and phase of the digitizing clock.

The burst samples A and B are used to develop a signal that represents the phase error between the signal obtained from the phase lock loop 26, which provides a four times subcarrier sampling clock ($4f_{sc}$) and the zero crossings of the off-tape burst signal. The burst samples are changed with relation to the clock phase error as depicted in FIG. 6. Sample A is negative when the clock is advanced in phase, and positive when the clock is delayed in phase. When there is no clock phase error, burst sample A is at zero, and burst sample B is displaced by 90°, as shown in FIG. 6c. Since sample A does not follow the phase error in a linear fashion, a clock to burst phase calculator 32, shown in FIG. 4, calculates the phase error angle $\theta$ between the $4f_{sc}$ clock samples and the burst zero crossings (FIG. 7), employing the equation recited in FIG. 3. The error signal $\theta$ represents the phase error between the clock and burst over 360°, and is independent of burst amplitude. It is noted that $\theta$ depends only on the ratio of sample A to sample B. The arc-tangent of the ratio of these two values define the sampling position of the burst. The arctangent of $\theta$ is valid only for $\theta$ over the range of ±90°. To obtain phase error over the entire 360° range, the calculator 32 senses the sign of sample B and adds 180° to $\theta$ if sample B is negative. The clock phase error value for the late burst is directed to a switch 64 which enables line-by-line phase correction of the clock by the frequency synthesizer. The clock-to-burst calculator 32 passes the phase error values from early burst to a burst phase subtractor including a register 34 and subtractor circuit 36. The subtractor circuit gives the phase error across a line. The clock phase error across a line is then applied to a constant scaler 38, and thence an adder 40 which forms a frequency accumulator with register 42 that is timed by the horizontal clock pulse. The K scaler 38 converts the phase error across a line to frequency error.

If there is no frequency error between the video signal and the subcarrier clock signal, then there is no accumulated phase error across a horizontal line. Velocity compenation is achieved by setting the clock subcarrier frequency to be equal to the offtape video subcarrier frequency at the start of each line. The clock determines the frequency error between the input video and the clock by measuring the phase error that accumulates across a line relative to the current subcarrier clock. The phase error is obtained by comparing two consecutive bursts of the input video to the current clock. If no frequency error exists, the clock-to-burst phase measurement of one burst is the same as for the next burst. The burst phase subtractor 34, 36 serves to calculate the phase error across a line by subtracting the clock-to-burst phase values of the two consecutive bursts.

The clock frequency error signal from the K scaler 38 represents the amount by which the frequency of the clock must be changed to match the input signal frequency. The current clock frequency value is maintained by the frequency accumulator, consisting of the adder 40 and shift register 42. For each horizontal line, the frequency error is added to the current subcarrier clock frequency to form a new clock frequency, which replaces the previous frequency value as the register 42 is clocked for each line. The frequency accumulator allows the clock to lock its frequency to that of the input signal in a closed loop configuration. If the clock is low in frequency, the frequency error will be positive and the current clock frequency will increase until the error is zero. Similarly, if the clock is high in frequency, the error will be negative and the clock frequency will decrease until the error is zero. The output of the frequency accumulator is a 20-bit frequency control word that is passed to the frequency synthesizer 22.

The frequency synthesizer 22, which is the digital equivalent of a voltage controlled oscillator (VCO), operates to correct the phase of the 4× subcarrier clock on a line-by-line basis. As depicted in FIG. 5, the synthesizer includes a phase accumulator 43, consisting of an added 44 and register 46, under control of the reference clock 24, which provides a fixed 20.46 MHz timing signal. The updated frequency control word from register 42 of the processor 20 is fed to the phase accumulator 43 of the frequency synthesizer 22. FIG. 8a illustrates the phase accumulator operating at the subcarrier frequency of 3.58 MHz. If using another format than the NTSC standard, for example the PAL or PAL-M formats, the phase accumulator is programmed for 4.43 MHz by choosing a larger phase increment.

The phase accumulator generates a digital ramp (FIG. 8a) at the desired output frequency ($f_{sc}$). The phase accumulator, which is clocked at a constant rate by the crystal oscillator 24, provides an output signal to register 46 of a 20-bit binary number representing 360° of phase. Each time the phase accumulator is clocked by the 20.46 MHz clock, the phase advances by an amount equal to the value of the frequency control word. The phase continues to increase until it exceeds 360°. At this point, the accumulator overflows and the phase wraps around to a number less than 360°, derived from the current phase and the phase increment represented by the control word. For example, if the current phase is 350° and the phase increment or control word is 27°, the accumulator overflows to 17°. The phase will cycle through 360° of range at a rate proportional to the phase increment or frequency control word. The frequency of the phase accumulator output signal is directly related to the value of the phase increment or the frequency control word.

The digital ramp waveform generated by the phase accumulator is converted to a digital represenation of a sine wave by the sine lookup PROM 48. The PROM converts the digital signal from the phase accumulator to a sine wave amplitude, and functions to convert 360° of phase to one full sine wave cycle. The output signal from the sine PROM is a digital word that is converted by the digital-to-analog converter 50 to a series of voltage levels which represent the instantaneous amplitude of the sine wave, as depicted in FIG. 8b. The output from the digital-to-analog converter is sinusoidal, but contains sampling steps at the 20.46 MHz clock rate, which are removed by a low pass filter 52 with a 7 MHz cutoff frequency. The result is a pure fundamental sine wave having the correct frequency of 3.58 MHz, such as shown in FIG. 8c.

Since the video signal is digitized at $4\times$ the subcarrier, ($4f_{sc}$), the sinusoidal subcarrier frequency from the tape must be multiplied by 4. This is accomplished in the phase lock loop 26, which conventionally contains a phase comparator, a loop filter, a voltage controlled oscillator (VCO), and a divide by 4 counter. The phase lock loop 26 settles rapidly to the line-by-line phase corrections that are applied to the tape subcarrier phase via switch 64 and thus has a very high bandwidth. Also, as a result, phase noise generated by the analog VCO is suppressed.

The digital sync low pass filter 16 operates to average several adjacent video samples to form each output sample, and is used in conjunction with burst to provide filtered chroma line type signals that are used by a memory control to maintain a correct color at the output of the timing base correction system. The digitized sync leading edge from late video which is applied to the filter 16 is utilized by the tape clock to generate horizontal timing signals.

To obtain chroma line signals for use by the memory control of the system, the digitized late video signal that is processed by the analog-to-digital converter 14 is applied to the digital sync low pass filter 16. The filtered signal is compared in a compartor 58 which generates coarse sliced sync signals that go high when the video sync samples cross below a predetermined slice level. As shown in FIG. 9, the detected digitized sync leading edge signals are sampled at the $4f_{sc}$ rate and accurate timing information is obtained by the clock-to-sync phase calculator 54. To find a point where the sync crosses the 50% slice level to an accuracy of a few degrees of subcarrier frequency, the phase between the sync slice crossing and the first clock sample below the slice level, designated as L, is computed by determining the phase $\theta_{sc}$ which is equal to 90° times $(S-L)/(U-L)$, where S is the 50% slice level, U is the sample just above the slice level and L is the sample just below the slice level.

The late video sync signal that is provided by the phase calculator 54 contains sync-to-burst phase information that is applied to an adder 56 which produces a measured sync-subcarrier phase (scH) of the offtape signal for each horizontal line. The measurement is defined over 360° and is nominally 0° for video lines with positive burst polarity and 180° for negative burst lines. By comparing the measured syncsubcarrier phase signal to a phase reference in comparator 60, a burst polarity signal H/2 (where H is at horizontal rate) is obtained for further utilization. The phase reference is set midway between the two scH values for positive and negative burst types to afford maximum immunity to noise.

In addition, a horizontal write pulse is produced by means of the comparator 58 coupled to receive the filtered sync singal from the low pass filter 16. As previously mentioned, the comparator 58 provides a coarse sliced sync signal to a burst crossing selector 62, which produces an H write pulse timed to the burst zero crossing phase. The burst zero crossing is selected by generating a one cycle wide window timed to the 50% slice point of the leading edge of the late sync singnals. This window is delayed from sync so that its center is coincident with burst zero crossings of a standard scH phase signal. The positive zero crossing closest to the center of the window is selected for timing if H/2 is low, i.e., a positive burst is present, while the negative zero crossing nearest the window center is selected if H/2 is high, when a negative burst is present.

There has been described herein a time base correction circuit for use in a television signal video recording and playback system wherein a $4\times$ subcarrier frequency digital clock is generated and locked in phase and frequency to the input video and burst signals derived off the recording tape. The clock follows the timing variations of the offtape signal over all speed ranges of the playback machine. The clock provides a horizontal timing pulse that is timed to a selected burst zero crossing of the offtape signal. The timing pulse is used by the timing correction circuit to define the start of each horizontal line stored in a memory. All timing error measurement is based on digitized sync and burst signals obtained from the analog-to-digital converter at the input to the correction circuitry, obviating the need for a separate analog phase comparator with associated circuitry.

What is claimed is:

1. A television signal processing system, wherein color video signal has a subcarrier frequency signal, and sync and color burst components, comprising:
   means for digitizing said sync and color burst signal components and for supplying the digitized components at an output thereof;
   said digitizing means having a clock input for receiving a sampling clock of predetermined frequency;
   signal processing means, coupled to the output of said digitizing means, for measuring the phase of the digitized color burst component relative to the phase of the sampling clock; and
   said signal processing means including a closed feedback loop coupled from the phase measuring means back to the clock input of said digitizing means, and further including means for applying phase and frequency corrections to the sampling clock in response to the relative phase measurement to match the sampling clock to the color video signal.

2. A television signal processing system as in claim 1, wherein said means for digitizing said sync and color burst signals is an analog-to-digital converter coupled to directly receive the color video signal.

3. A television signal processing system as in claim 1, wherein said signal processing means includes:
   a digital signal processor, coupled to the digitizing means for generating a frequency control word indicative of the difference in phase between the digitized color burst component and the sampling clock; and
   a digital frequency synthesizer, coupled to said digital signal processor, for generating the sampling clock with a phase adjusted in response to the phase measurement, and with the frequency adjusted in response to said frequency control word.

4. A television signal processing system as in claim 3, wherein said digital signal processor includes:
   digital phase subtractor means for supplying the phase difference between two consecutive digitized color bursts; and
   digital frequency accumulator means coupled to the phase subtractor means for supplying said frequency control word corrected on a line-by-line basis to said digital frequency synthesizer.

5. A television signal processing system as in claim 3, further including;
   phase calculating means, coupled to the digitizing means, for supplying sampling clock-to-color burst phase errors to the digital signal processor for measurement thereof.

6. A television signal processing system as in claim 5 wherein:
   said phase calculating means supplies the clock-to-burst phase errors to the digital frequency synthesizer on a line-by-line basis to effect phase correction of the sampling clock.

7. A television signal processing system as in claim 6 wherein the digital frequency synthesizer includes:
   digital phase accumulator means for maintaining the current phase of the digital frequency synthesizer; and
   means coupled to the digital phase accumulator means for transferring the phase thereof into a clocking edge having a corresponding phase to provide the adjusted sampling clock to the digitizing means.

8. In a television recording and playback system wherein input video signals are processed, said signals having a nominal subcarrier frequency signal and color burst and horizontal sync components, a digital clock generator circuit comprising:
   means for selectively delaying said input video signals to provide a delayed late video signal and an undelayed early video signal;
   a converter for sampling said delayed and undelayed video signals at a multiple frequency of said subcarrier in response to a sampling clock, and for converting said delayed and undelayed video signals to corresponding digital signals;
   a digital signal processsor, coupled to receive the corresponding digital signals from said converter, for providing a phase error signal for adjusting the phase of the sampling clock while providing a digital frequency control word for adjusting the frequency of the sampling clock
   a digital frequency synthesizer, coupled to said processor, for supplying the sampling clock to the converter with its phase and frequency adjusted in response to said phase error signal and said frequency control word.

9. A circuit as in claim 8, including a video switch coupled between said delaying means and said converter, for switching between said delayed and undelayed signal at predetermined times.

10. A circuit as in claim 9, including a bandpass filter, coupled in a first channel to said converter, for filtering noise from said color burst component and for producing two filtered video samples that are 90° apart in phase.

11. A circuit as in claim 9 wherein,
    said converter supplies consecutive digitized color bursts on a line-by-line basis; and
    said digital signal processor includes a clock-to-burst phase calculator coupled to receive consecutive digitized color bursts and for supplying error signals representing phase error between the sampling clock and zero crossings of said burst signal component.

12. A circuit as in claim 11, wherein said digital signal processor further includes:
    a burst phase subtractor coupled to said clock-to-burst phase calculator for supplying the phase error between consecutive digitized color bursts; and
    a frequency accumulator coupled to the burst phase subtractor for adjusting the frequency of the digital frequency control word in response to the subtracted phase error.

13. A circuit as in claim 12, wherein said frequency accumulator generates an adjusted frequency control word on a line-by-line basis for application to said frequency synthesizer.

14. A circuit as in claim 12, wherein said burst phase subtractor comprises:
    a storage register controlled by a horizontal sync pulse clock; and
    a subtractor coupled to said register and operating over a 360° range for providing a clock phase error across a horizontal line.

15. A circuit as in claim 14, further including a constant scaler, connected to said subtractor, to provide a clock frequency error from the subtracted phase error.

16. A circuit as in claim 12, wherein said frequency accumulator comprises an adder and a register timed by a horizontal sync clock, said adder and register connected in a closed loop for generating the frequency control word.

17. A circuit as in claim 11, wherein said digital frequency synthesizer includes:
    a phase accumulator coupled to the digital signal processor, for supplying a binary number representing 360° of phase, and which phase changes by an amount determined by said digital frequency control word.

18. A circuit as in claim 17, wherein said frequency synthesizer includes a sine lookup program read only memory for generating a sine waveform substantially without harmonics and having a phase representing the phase of said phase accumulator.

19. A circuit as in claim 18, including:
    a digital-to-analog converter coupled to said read only memory; and
    a low pass filter coupled to said digital-to-analog converter and having a cutoff frequency whereby a pure fundamental sine wave is produced.

20. A circuit as in claim 8, including a low pass filter, connected in a second channel to said analog-to-digital converter, for filtering noise from said horizontal sync component.

21. A circuit as in claim 20, including means for selecting burst zero crossings that are coincident with the horizontal sync pulses, for generating a horizontal write pulse to achieve phase adjustment for the horizontal picture position.

22. A method for processing a television signal which has a subcarrier frequency signal, and sync and color burst components, comprising:
   generating a sampling clock;
   digitizing said television signal sync and color burst components in response to the sampling clock
   measuring the phase of the digitized color burst component relative to the phase of the sampling clock to provide a phase error correction signal and a frequency error correction signal; and
   removing the sampling phase error from said digitized television signal, sync and color burst components by adjusting the sampling clock in response to said phase error and frequency error correction signals.

23. A method as in claim 22 wherein:
   the step of digitizing includes, supplying two consecutive digitized color bursts corresponding to consecutive color burst components to provide late and early digitized color bursts; and
   the step of measuring includes, subtracting the phase errors between the late and early digitized color bursts to provide the phase error across a line, and generating a digital frequency control word corresponding to said frequency error correction signal in response to the phase error across the line.

24. A method as in claim 23 wherein the step of removing inlcudes:
   adjusting the phase of the sampling clock by correcting the clock-to-burst phase error at the beginning of each line; and
   adjusting the frequency of the sampling clock on a line-by-line basis in response to the digital frequency control word.

25. A method as in claim 24 including:
   operating the sampling clock at a frequency that is a multiple of said subcarrier frequency; and
   digitizing the television signal, and the sync and color burst components with the adjusted sampling clock which is locked to the color burst component of the television signal.

* * * * *

UNITED STATES PATENT AND TRADEMARK OFFICE
CERTIFICATE OF CORRECTION

PATENT NO. : 4,675,724

DATED : June 23, 1987

INVENTOR(S) : Steven D. Wagner

It is certified that error appears in the above-identified patent and that said Letters Patent is hereby corrected as shown below:

Column 2, line 27, "shcematic" should read --schematic--;
Column 3, line 16, delete "low";
Column 5, line 61, "$0_{sc}$" should read --$0_{cs}$--;

Column 6, line 13, "singal" should read --signal--;
line 46, after "wherein" insert --a--.

Signed and Sealed this

Twenty-sixth Day of April, 1988

Attest:

DONALD J. QUIGG

*Attesting Officer*  *Commissioner of Patents and Trademarks*